United States Patent

[11] 3,581,427

| [72] | Inventor | Reinert M. Reinertson<br>229 W. Flint St., Davison, Mich. 48423 |
|---|---|---|
| [21] | Appl. No. | 845,318 |
| [22] | Filed | July 28, 1969 |
| [45] | Patented | June 1, 1971 |

[54] FISHING ROD CONSTRUCTION
15 Claims, 6 Drawing Figs.

[52] U.S. Cl. ............................................................. 43/24
[51] Int. Cl. ....................................................... A01k 87/04
[50] Field of Search ............................................ 43/24, 18, 19, 21.2, 27.4

[56] References Cited
UNITED STATES PATENTS

| 20,309 | 5/1858 | Underwood et al. ......... | 43/24 |
| 488,678 | 12/1892 | Leprohon ..................... | 43/21.2 |
| 506,093 | 10/1893 | Boardman ..................... | 43/24 |
| 2,792,658 | 5/1957 | Stafford ....................... | 43/27.4X |
| 2,878,608 | 3/1959 | O'Brien, Jr. .................. | 43/24 |
| 3,315,400 | 4/1967 | Axelson ....................... | 43/24 |

*Primary Examiner*—Warner H. Camp
*Attorney*—Barnes, Kisselle, Raisch & Choate

ABSTRACT: A reel and a line are mounted on a fishing rod and a plurality of pulley assemblies are positioned at longitudinally spaced points along the rod with the fishing line trained over the pulleys. Each pulley assembly is mounted for pivotal movement about an axis generally parallel to the axis of the rod and pivotal movement about an axis transverse to the axis of the rod.

PATENTED JUN 1 1971 3,581,427
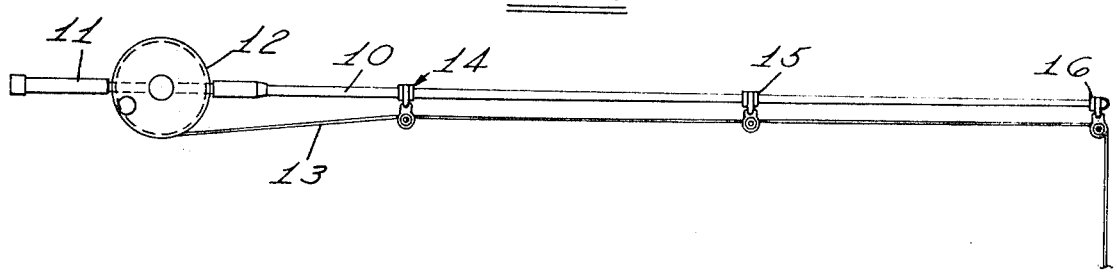
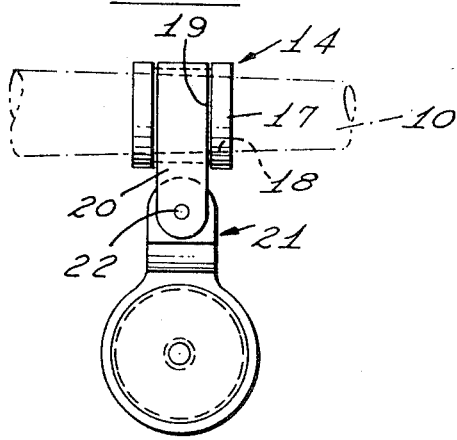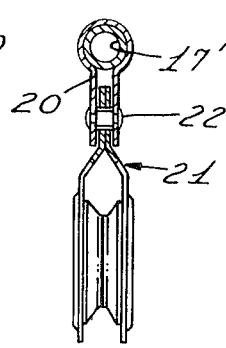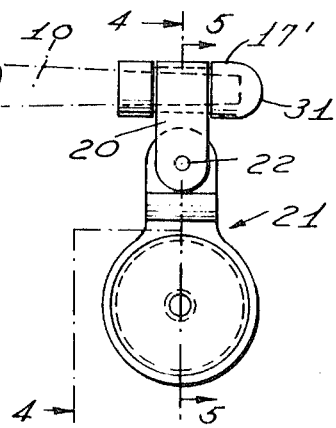
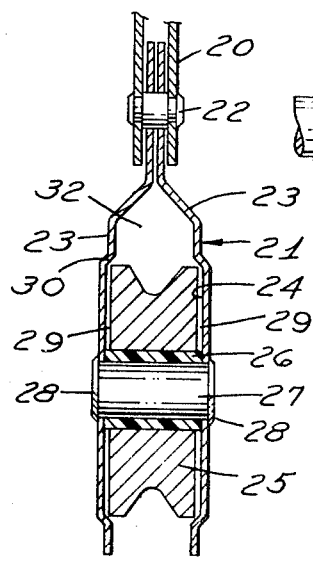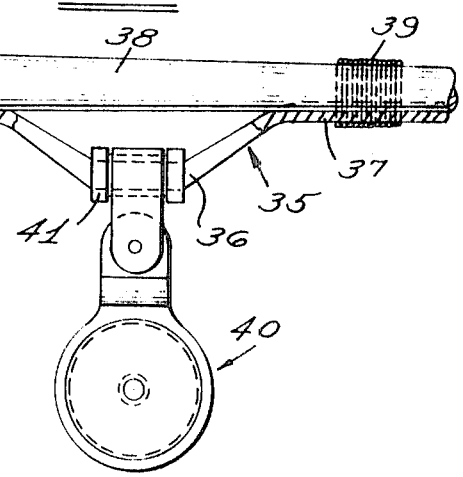
INVENTOR
REINERT M. REINERTSON
BY
Barnes, Kisselle, Raisch & Choate
ATTORNEYS

FISHING ROD CONSTRUCTION

This invention relates to fishing rods and particularly to fishing rods that are utilized for deep sea or lake fishing.

BACKGROUND OF THE INVENTION

In deep sea or lake fishing, it is common to utilize a heavy line such as metal wire. In the handling of such a line, considerable difficulty may be encountered with conventional fishing rods which utilize fixed guide loops at longitudinally spaced points on the rod.

Accordingly, among the objects of the invention are to provide a fishing rod structure which makes it easier for a fisherman to manipulate the heavy line; wherein the line will not bind; wherein conventional rods can be readily converted; and which is subject to minimum maintenance.

SUMMARY OF THE INVENTION

A fishing rod comprising a reel and a line and a plurality of pulley assemblies at longitudinally spaced points along the rod and a fishing line is trained over the pulleys. Each pulley assembly is mounted for pivotal movement about an axis generally parallel to the axis of the rod and pivotal movement about an axis transverse of the rod.

DESCRIPTION OF THE DRAWINGS

FIG. 1 is a side elevational view of a fishing rod structure embodying the invention.

FIG. 2 is a side elevational view on an enlarged scale of a portion of the rod shown in FIG. 1.

FIG. 3 is a side elevational view of another portion of the rod shown in FIG. 1.

FIG. 4 is a transverse sectional view taken along the line 4-4 in FIG. 3.

FIG. 5 is a fragmentary part sectional view taken along line 5-5 in FIG. 3 on an enlarged scale and showing a portion of the device shown in FIG. 4.

FIG. 6 is a fragmentary side elevational view on an enlarged scale of a modified form of the invention.

DESCRIPTION

Referring to FIG. 1, the fishing rod construction in accordance with the invention comprises a tubular reinforced glass fiber rod 10 mounted on a handle 11 that supports a reel 12. The reel 12 is preferably of the type having a relatively large diameter over which a wire line 13 is wound. At longitudinally spaced points along the rod, pulley assemblies 14, 15, 16 are provided. Each of the pulley assemblies is of generally the same construction as will be presently described.

Referring to FIG. 2, the pulley assembly 14 comprises a stainless steel bushing 17 that has a tapered opening 18 which frictionally engages a corresponding tapered portion of the rod 10. Bushing 17 is formed with an annular groove 19 and a stainless steel strap 20 is positioned in the groove with the ends thereof extending downwardly. A stainless steel pulley housing 21 is pivotally mounted for movement about a transverse axis on the lower ends of the strap 20 by a stainless steel rivet 22. The housing 21 comprises spaced housing members 23 which have circular recesses 24. A stainless steel pulley 25 is rotatably mounted between the portions 23 of housing 21 by an arrangement which includes a low friction tubular spacer 26 of nylon or similar plastic on which the pulley is rotatably mounted and a stainless steel rivet 27 extending through the spacer 26 and having its ends deformed as at 28 to hold the pulley axially in position.

The length of the spacer 26 is greater than the width of the pulley 25 so that when the rivet ends are deformed, a space 29 is provided between the bottom of the recess 24 and the pulley 25 permitting free rotation of the pulley. At the same time, the periphery 30 of each recess 24 extends inwardly along the periphery of the pulley thereby preventing the line 13 from entering between the pulley and the housing and causing jamming or damage.

The construction of the pulley assembly 15 is identical to that of the pulley assembly 14 except that the bushing is of smaller size.

Similarly, the pulley assembly 16 is of even smaller size and has a bushing 17' with a closed end 31 to form the tip of the rod (FIG. 3).

In use, the fishing line 13 is trained over the pulleys in the space 32. Since the straps 20 are free to swing about the axis of the rod 10 and the pulleys 21 are free to swing about the transverse axes of the rivets 22, the manipulations of the rod by the fisherman are minimized, the pulleys being free to swing with lateral or longitudinal loads on the line.

The construction of the pulleys prevents jamming of the line between the pulley and the pulley housing.

Where smaller rods of conventional construction are provided, they may be readily converted to utilization of the invention as shown in FIG. 6 by the use of support members 35 which have a central portion 36 extending through a pulley assembly and end portions 37 that are arcuate to conform to the periphery of a rod 38. Plastic cord or wire 39 can be used for holding a pulley assembly on the rod. In the pulley assembly 40, the bushing preferably has a constant diameter. In all other respects, the pulley assembly is identical to the construction described with reference to pulley assembly 14.

I claim:
1. The combination comprising
    a fishing rod, rod, a reel including a line mounted on said rod,
    and a plurality of longitudinally spaced pulley assemblies on the rod for guiding said line,
    means for mounting each said pulley assembly on said rod,
    each said pulley assembly comprising a bushing,
    each said bushing having an annular groove therein,
    a strap freely movable circumferentially around said bushing within the portion defined by the groove and having its free ends in adjacent relationship,
    a pulley housing,
    means extending through the ends of the strap and the pulley housing for pivotally mounting the housing about a transverse axis with respect to said strap,
    said pulley housing defining spaced portions,
    and a pulley,
    means rotatably mounting said pulley within said spaced portions of said housing.
2. The combination set forth in claim 1 wherein said rod has longitudinally spaced portions which have progressively decreasing diameter toward the tip of the rod,
    each said bushing has a tapered opening for engaging a corresponding tapered portion of the rod.
3. The combination set forth in claim 1, wherein said means for mounting each said pulley assembly on said rod comprises a member extending through said bushing and having portions thereof engaging longitudinally spaced portions of the rod,
    and means for fastening said portions of said member to said rod.
4. The combination set forth in claim 1 wherein said spaced portions of said pulley housing having annular recesses for receiving portions of the pulley thereby preventing portions of the line from entering between said pulley and said housing.
5. The combination set forth in claim 4 wherein said means rotatably mounting said pulley and said housing comprises a hollow spacer,
    a shaft extending between said spaced portions of said housing,
    the length of said spacer being slightly greater than the thickness of said pulley.
6. The combination set forth in claim 5 wherein said spacer is made of low friction plastic material.
7. The combination set forth in claim 1 wherein said bushing member nearest the end of said rod has a closed end.
8. The combination comprising
    a fishing rod having longitudinally spaced portions which have progressively decreasing diameter toward the tip of the rod, a reel including a line mounted on said rod, and a plurality of longitudinally spaced pulley assemblies on the rod for guiding said line, each said pulley assembly comprising a bushing having a tapered opening engaging a complementary tapered portion of the rod, each said bushing having an annular groove therein, a strap freely movable circumferentially around said bushing within the portion defined by the groove and having its free ends in adjacent relationship, a pulley housing, means extending through the ends of the strap and the pulley housing for pivotally mounting the housing about a transverse axis with respect to said strap, said pulley housing defining spaced portions, and a pulley, means rotatably mounting said pulley within said spaced portions of said housing, said spaced portions of said pulley housing have annular recesses for receiving portions of the pulley thereby preventing portions of the line from entering between said pulley and said housing.

9. The combination set forth in claim 8 wherein said means rotatably mounting said pulley and said housing comprises a hollow spacer, a shaft extending between said spaced portions of said housing, the length of said spacer being slightly greater than the thickness of said pulley.

10. For use with a fishing rod having longitudinally spaced portions which have progressively decreasing diameter toward the tip of the rod, a pulley assembly for guiding a line on said rod comprising a bushing, said bushing having an annular groove therein, a strap freely movable circumferentially around said bushing within the portion defined by the groove and having its free ends in adjacent relationship, a pulley housing, means extending through the ends of the strap and the pulley housing for pivotally mounting the housing about a transverse axis with respect to said strap, said pulley housing defining spaced portions, and a pulley, means rotatably mounting said pulley within said spaced portions of said housing.

11. The combination set forth in claim 10 wherein said bushing has a tapered opening therein engaging a corresponding tapered portion of the rod.

12. The combination set forth in claim 10 including means for mounting said bushing on a rod comprising a member extending through said bushing and having portions thereof adapted to engage longitudinally spaced portions of the rod.

13. The combination set forth in claim 10 wherein said spaced portions of said pulley housing have annular recess portions for receiving portions of the pulley thereby preventing portions of the line from entering between said pulley and said housing.

14. The combination set forth in claim 10 wherein said means rotatably mounting said pulley and said housing comprises a hollow spacer, a shaft extending between said spaced portions of said housing, the length of said spacer being slightly greater than the thickness of said pulley.

15. The combination set forth in claim 10 wherein said spacer is made of low friction plastic material.